(12) United States Patent
Deshpande (10) Patent No.: US 11,846,062 B2
(45) Date of Patent: Dec. 19, 2023

(54) CONSTANT FORCE DAMPING ASSEMBLY FOR A WASHING MACHINE

(71) Applicant: Haier US Appliance Solutions, Inc., Wilmington, DE (US)

(72) Inventor: Rajendra Dattatraya Deshpande, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 28 days.

(21) Appl. No.: 17/671,787

(22) Filed: Feb. 15, 2022

(65) Prior Publication Data

US 2023/0257922 A1 Aug. 17, 2023

(51) Int. Cl.
*D06F 37/24* (2006.01)

(52) U.S. Cl.
CPC .................................. *D06F 37/245* (2013.01)

(58) Field of Classification Search
CPC ...................................................... D06F 37/245
See application file for complete search history.

(56) References Cited

U.S. PATENT DOCUMENTS

| 5,117,659 | A  | 6/1992  | Sharp et al.  |
| RE45,461  | E  | 4/2015  | Peuker et al. |
| 9,279,207 | B2 | 3/2016  | Yu et al.     |
| 9,758,915 | B2 | 9/2017  | Park et al.   |
| 9,951,454 | B2 | 4/2018  | Jeon          |
| 10,023,989 | B2 | 7/2018 | Yu et al.     |

FOREIGN PATENT DOCUMENTS

| CN | 202865627 U  | 4/2013  |
| CN | 111850977 A  | 10/2020 |
| FR | 2799694 A1   | 4/2001  |
| KR | 100742646 B1 | 7/2007  |

*Primary Examiner* — Jason Y Ko
(74) *Attorney, Agent, or Firm* — Dority & Manning, P.A.

(57) ABSTRACT

A constant damping system includes a damping body having a cap and a stem extending from the cap, a suspension rod accepted through the damping body, a damping fluid provided between the suspension rod and the stem of the damping body, the damping fluid configured to provide a constant damping force between the suspension rod and the stem, wherein the damping fluid is one of a hydro-carbon base or a silicon base, and an axial spring having a first end attached to the suspension rod and a second end contacting the cap of the damping body.

20 Claims, 8 Drawing Sheets

CONSTANT FORCE DAMPING ASSEMBLY FOR A WASHING MACHINE

FIELD OF THE INVENTION

The present subject matter relates generally to washing machine appliances, and more particularly to damping assemblies for washing machine appliances.

BACKGROUND OF THE INVENTION

Washing machine appliances generally include a cabinet that receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse the articles and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with damping devices. Some of these damping devices incorporate different damping measures, such as friction damping, pneumatic damping, or the like. However, these damping measures present several drawbacks. For one example, repeated wear on components leads to deterioration and short lifespans.

Accordingly, a damping system that obviates one or more of the above-mentioned drawbacks would be beneficial. Particularly, a damping system incorporating a constant damping force with minimal wear would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a constant damping system is provided. The constant damping system may include a damping body including a cap and a stem extending from the cap along the axial direction, a suspension rod accepted through the damping body along the axial direction, a damping fluid provided between the suspension rod and the stem of the damping body, the damping fluid configured to provide a constant damping force between the suspension rod and the stem, wherein the damping fluid is one of a hydro-carbon base or a silicon base, and an axial spring having a first end attached to the suspension rod and a second end contacting the cap of the damping body.

In another exemplary aspect of the present disclosure, a laundry treatment appliance is disclosed. The laundry treatment appliance may include a cabinet, a tub provided within the cabinet; and a constant damping system that connects the tub to the cabinet. The constant damping system may include a damping body including a cap and a stem extending from the cap along the axial direction, a suspension rod accepted through the damping body along the axial direction, a damping fluid provided between the suspension rod and the stem of the damping body, the damping fluid configured to provide a constant damping force between the suspension rod and the stem, wherein the damping fluid is one of a hydro-carbon base or a silicon base, and a spring having a first end attached to the suspension rod and a second end contacting the cap of the damping body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. As used herein, the terms "first," "second," and "third" may be used interchangeably to distinguish one component from another and are not intended to signify location or importance of the individual components.

Figure 1:
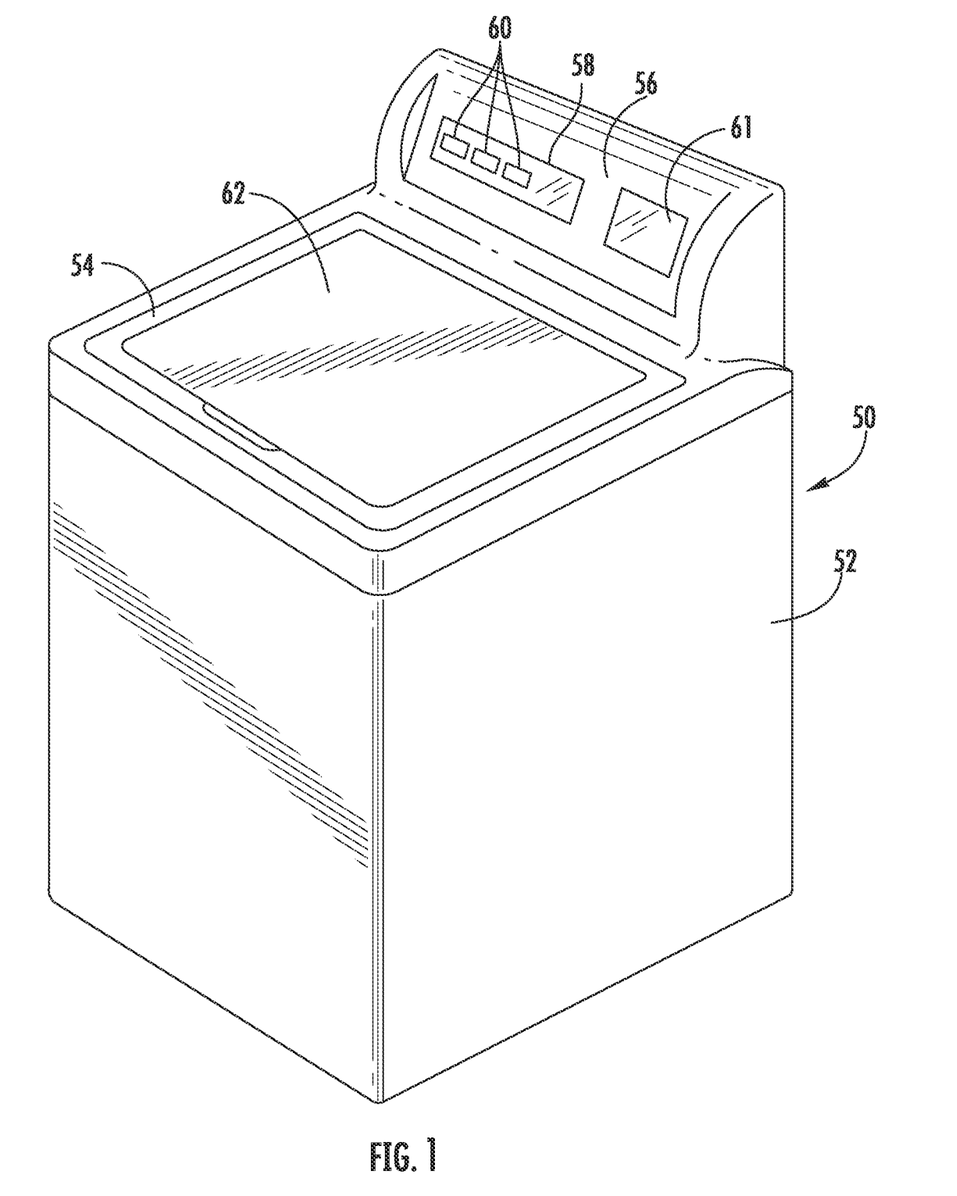
FIG. 1 provides a perspective view of a washing machine appliance in accordance with one or more exemplary embodiments of the present disclosure.

FIG. 1 provides a perspective view of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58, including a plurality of input selectors 60, is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 (FIG. 2) located within cabinet 52, and a closed position (shown in FIG. 1) forming an enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances.

Figure 2:
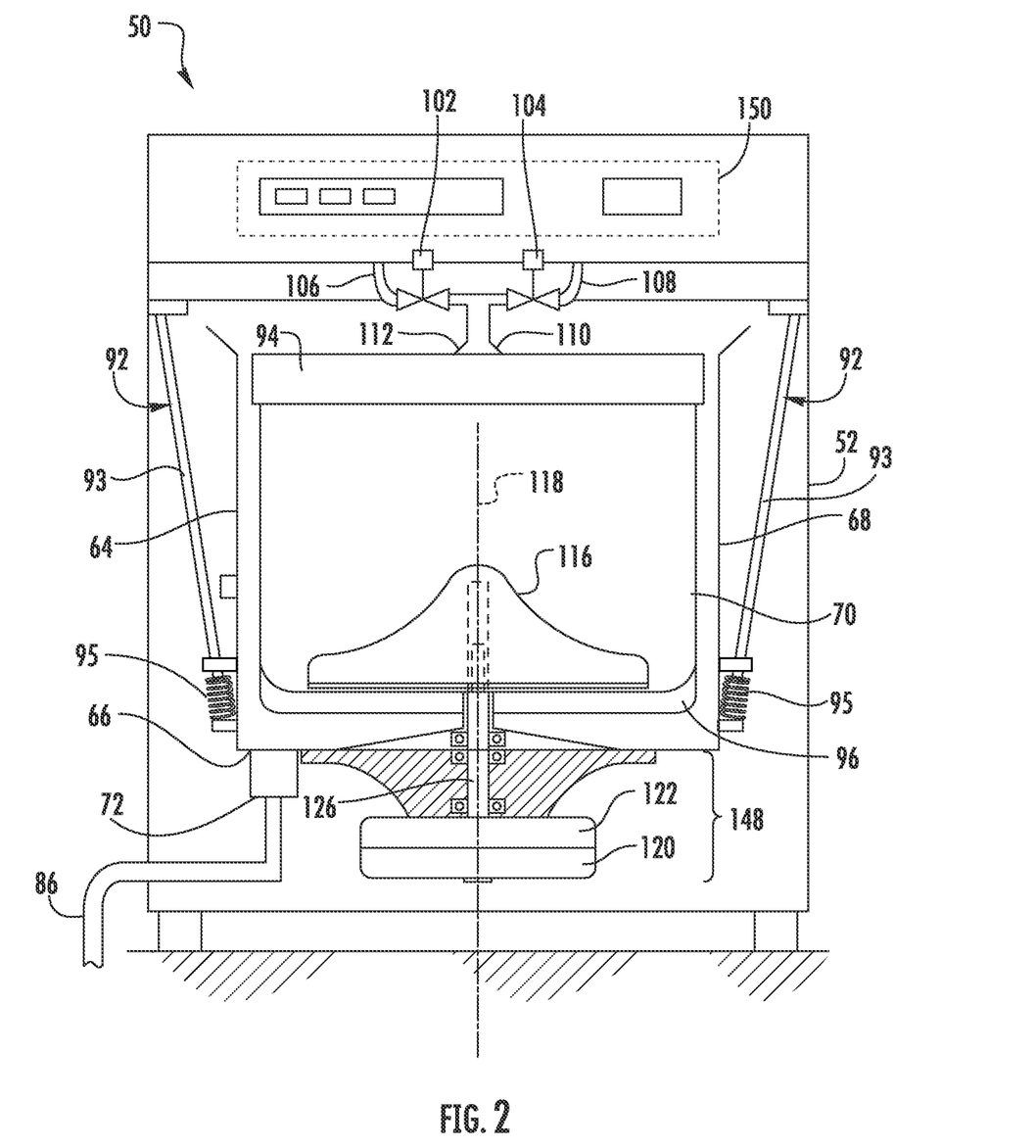
FIG. 2 provides a front elevation schematic view of various components of the washing machine appliance of FIG. 1.

FIG. 2 provides a front elevation schematic view of certain components of an example washing machine appliance 50 including a wash tub 64 and a basket 70 rotatably mounted within wash tub 64. Wash tub 64 includes a bottom wall 66 and a sidewall 68. A pump assembly 72 is located beneath tub 64 and basket 70 for gravity assisted flow when draining tub 64. A pump inlet hose 80 extends from the wash tub 64, e.g., from the bottom wall 66 thereof, to the pump assembly 72, and a pump outlet hose 86 extends from the pump assembly 72 to a building plumbing system discharge line (not shown).

As may be seen in FIG. 2, the wash basket 70 is movably disposed and rotatably mounted in wash tub 64 in a spaced apart relationship from tub side wall 68 and tub bottom wall 66. Basket 70 includes a plurality of perforations therein to facilitate fluid communication between an interior of basket 70 and wash tub 64.

A hot liquid valve 102 and a cold liquid valve 104 deliver liquid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and liquid is dispersed from inlet tube 110 through a nozzle assembly 112 having a number of openings therein to direct washing liquid into basket 70 at a given trajectory and velocity. A dispenser (not shown in FIG. 2), may also be provided to produce a liquid or wash solution by mixing fresh water with a detergent and/or other additive for cleansing of articles in basket 70.

Still referring to FIG. 2, an agitation element 116, such as a vane agitator, impeller, auger, or oscillatory basket mechanism, or some combination thereof, is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated, agitation element 116 is oriented to rotate about a vertical axis 118.

Basket 70 and agitation element 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred to herein as a motor assembly 148.

Basket 70, tub 64, and machine drive system 148 are supported by a vibration dampening suspension system. The dampening suspension system generally operates to dampen dynamic motion as the wash basket 70 rotates within the tub 64. The dampening suspension system can include one or more suspension assemblies 92 coupled between and to the cabinet 52 and wash tub 64. Typically, four suspension assemblies 92 are utilized, and are spaced apart about the wash tub 64. For example, each suspension assembly 92 may include a suspension rod 93 connected at one end proximate a corner of the cabinet 52 and at an opposite end to the wash tub 64. The opposite end of the suspension rod 93 connected to the wash tub 64 may be surrounded, e.g., encircled, by a suspension spring 95 and may further be enclosed by a damper body 192 (FIGS. 3 through 6) between the suspension rod 93 and the suspension spring 95.

In addition to the vibration dampening suspension assemblies 92, the washer can include other vibration dampening elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

Operation of washing machine appliance 50 is controlled by a controller 150 that is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

Controller 150 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 (such as motor assembly 148) may be in communication with controller 150 via one or more signal lines or shared communication busses to provide signals to and/or receive signals from the controller 150.

In an illustrative embodiment, laundry items are loaded into basket 70, and washing operation is initiated through operator manipulation of control input selectors 60 (shown in FIG. 1). Tub 64 is filled with liquid such as water and mixed with detergent to form a wash fluid, and basket 70 is agitated with agitation element 116 for cleansing of laundry items in basket 70. For example, agitation element 116 may be moved back and forth in an oscillatory back and forth motion about vertical axis 118, while basket 70 remains generally stationary (i.e., not actively rotated). Such oscillatory motion may be obtained in different embodiments with a reversing motor, a reversible clutch, or other known reciprocating mechanism. After the agitation phase of the wash cycle is completed, tub 64 is drained with pump assembly 72. Laundry articles can then be rinsed by again adding liquid to tub 64. Depending on the particulars of the cleaning cycle selected by a user, agitation element 116 may again provide agitation within basket 70. After a rinse cycle, tub 64 is again drained, such as through use of pump assembly 72. After liquid is drained from tub 64, one or more spin cycles may be performed. In particular, a spin cycle may be applied after the agitation phase and/or after the rinse phase in order to wring excess wash fluid from the articles being washed. During a spin cycle, basket 70 is rotated at relatively high speeds about vertical axis 118, such as between approximately 450 and approximately 1300 revolutions per minute.

While described in the context of specific embodiments of washing machine appliance 50, using the teachings disclosed herein it will be understood that washing machine appliance 50 is provided by way of example only. Other washing machine appliances having different configurations (such as vertical and/or horizontal-axis washing machine appliances), different appearances, and/or different features may also be utilized with the present subject matter as well. Additionally or alternatively, a connection of suspension assemblies 92 between tub 64 and cabinet 52 is provided as an example, and that any suitable arrangement may be used for suspension assemblies 92. For instance, suspension assemblies 92 (e.g., suspension rods 93) may be orientated vertically within cabinet 52.

Figure 3:
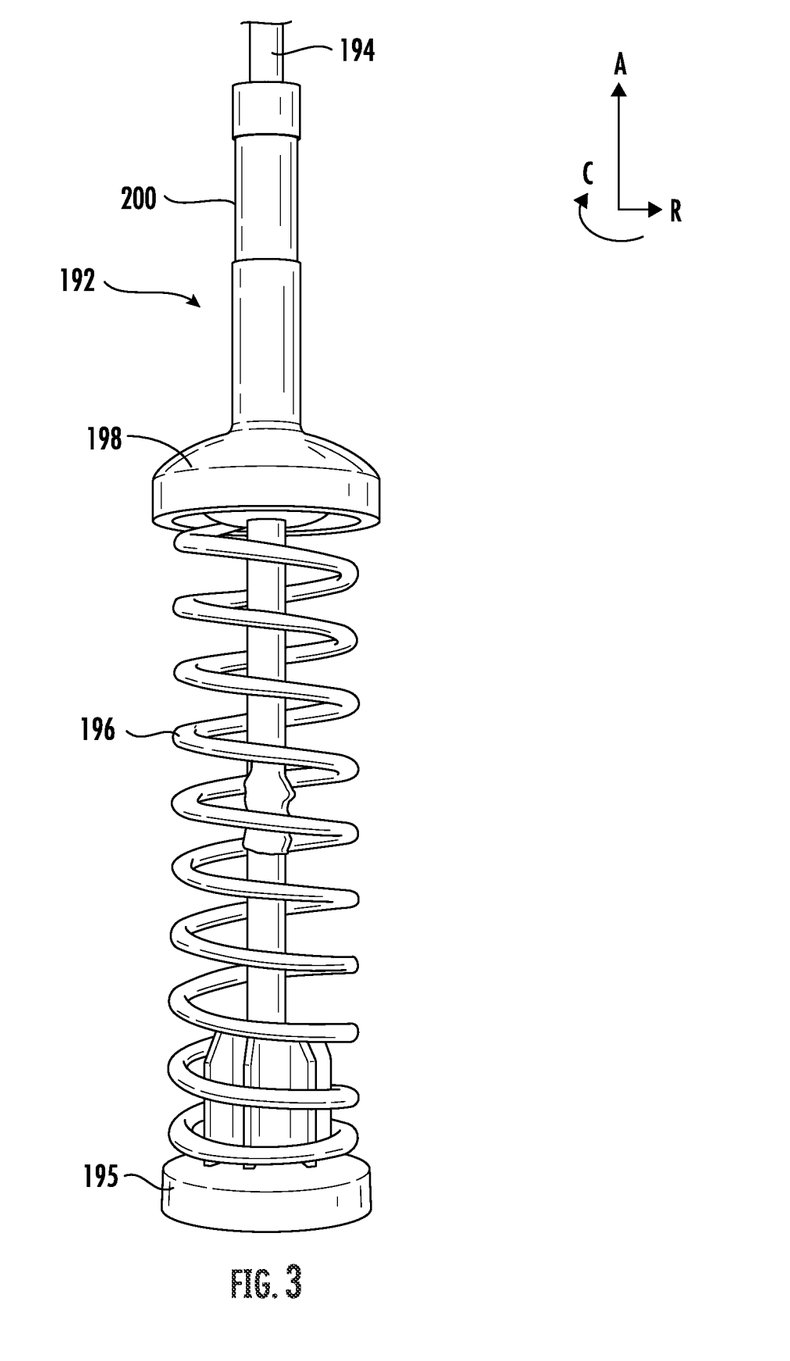
FIG. 3 provides a perspective view of a portion of a damping assembly according to an exemplary embodiment of the present disclosure.

FIG. 3 provides an enlarged view of a portion of a vibration dampening suspension system such as may be incorporated into the washing machine appliance 50 of FIGS. 1 and 2. In detail, a constant damping system 190 is shown in FIG. 3, the constant damping system 190 being an embodiment of a suspension assembly 92. Hereinafter, a description of constant damping system 190 will be set forth in detail, with specific reference to FIGS. 3 and 4. For instance, constant damping system 190 may include a damping body 192, a suspension rod 194, and an axial spring 196. Suspension rod 194 may be the same as or similar to suspension rod 93 and axial spring 196 may be the same as or similar to suspension spring 95.

As shown in FIG. 3, suspension rod 194 may extend along an axial direction A, e.g., between the tub 64 and the cabinet 52 of the washing machine appliance 50 (FIG. 2). For instance, suspension rod 194 may define a first axial end connected to or proximal cabinet 52 and a second axial end connected to or proximal tub 64. Suspension rod 194 may also define a radial direction R perpendicular to the axial direction A and a circumferential direction C extending around the axial direction A. According to at least some embodiments, suspension rod 194 is formed from a zinc coated steel. Advantageously, the zinc coated steel may have a rough surface, increasing a surface energy thereof when interacting with damping body 192 and/or a damping fluid (described below). In some embodiments, the zinc coated steel may define a plurality of bumps, ridges, or other protrusions which may increase a coefficient of friction of suspension rod 194.

As described above, suspension rod 194 may connect tub 64 with cabinet 52. Thus, tub 64 may be supported by suspension rod 194 by, e.g., damping body 192. In detail, damping body 192 may include a cap 198 and a stem 200 extending (e.g., along the axial direction A) from cap 198. Tub 64 may rest on damping body 192. For instance, tub 64 may have a cup or flange formed therein that accepts damping body (e.g., cap 198) therein, such that tub 64 is supported on cap 198. Cap 198 may thus have a dome shape being concave upward along the axial direction A. Damping body 192 may include or be made from a plastic. According to at least some embodiments, damping body 192 includes or is made from a self-lubricating polymer. A specific shape of cap 198 may vary according to specific embodiments, however, and the disclosure is not limited to the examples given herein.

The dome shape of cap 198 may define a cavity 197. For instance, an underside of cap 198 may be convex upward along the axial direction A. A plurality of ribs 199 (FIG. 4) may be formed within cavity 197 and may notably provide strength to cap 198. Ribs 199 may extend along the radial direction R from a center of cavity 197 toward an outer circumferential edge of cap 198. Any suitable number of ribs 199 may be formed therein. In at least one example, six ribs 199 are formed therein. Accordingly, tub 64 may be stably supported on damping body 192.

Axial spring 196 may surround suspension rod 194 (e.g., along the circumferential direction C). Axial spring 196 may be a coil spring, for example. However, it should be understood that axial spring 196 may be any form of elastic member so as to provide elastic support to damping body 192 (e.g., along or relative to the axial direction A). Axial spring 196 may be provided beneath damping body 192 (e.g., along the axial direction A). For instance, a top of axial spring 196 may be accepted within cavity 197 of cap 198. Accordingly, damping body 192 may be elastically supported by axial spring 196 with respect to suspension rod 194.

Suspension rod 194 may have a stopper 195 fixed thereto. For instance, stopper 195 may accept a distal end of suspension rod 194 (i.e., distal from the connection point between suspension rod 194 and cabinet 52). A distal end of axial spring 196 may be fixed to stopper 195. Thus, axial spring 196 may be supported between cavity 197 of damper body 192 and stopper 195. Because suspension rod 194 is also fixed to stopper 195, tub 64 may be elastically supported by axial spring 196 via damping body 192.

Figure 4:
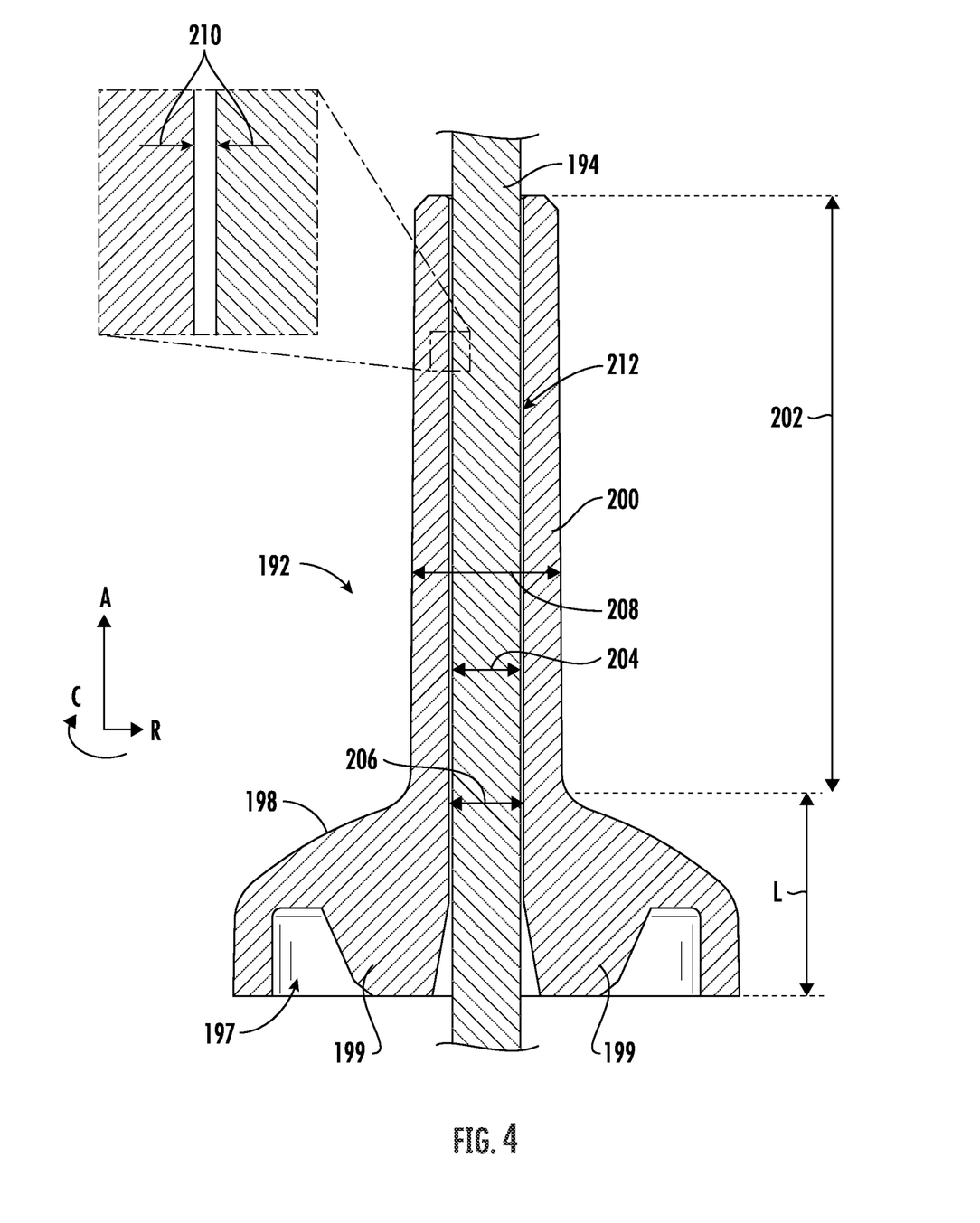
FIG. 4 provides a side cross-section view of a damping body and suspension rod of the exemplary damping assembly of FIG. 3.

Referring now to FIG. 4, a section view of damping body 192 and suspension rod 194 is shown. In particular, stem 200 is shown in relation to suspension rod 194. In detail, stem 200 may be referred to as a long stem. Stem 200 may have a length 202 in the axial direction A that is between at least twice a length L of cap 198 and at least four times the length L of cap 198 along the axial direction A. Accordingly, a relatively large surface area of stem 200 may be in contact with (or adjacent to) suspension rod 194. For instance, suspension rod 104 may define a first diameter 204. First diameter 204 may vary according to specific embodiments of the present disclosure, and according to specific applications thereof. For instance, large load applications may utilize a suspension rod 194 having a relatively larger diameter 204.

Stem 200 may thus define an inner diameter 206 and an outer diameter 208. Inner diameter 206 may be concentric with first diameter 204 of suspension rod 194. Moreover, inner diameter 206 may be formed within a certain tolerance of first diameter 204. According to at least some embodiments, the tolerance between inner diameter 206 and first diameter 204 may be between about 0.01 inches and about 0.0001 inches. For instance, a radial gap 210 between suspension rod 194 and stem 200 may be between 0.01 inches and 0.0001 inches. For at least one example, the radial gap 210 is about 0.001 inches. Thus, a relatively tight tolerance between suspension rod 194 and stem 200 may be ensured. Advantageously, a constant damping force may be ensured between stem 200 and suspension rod 194. As will be explained in more detail below, the damping force may be friction damping, viscous damping, or a combination thereof.

A damping fluid 212 may be provided within radial gap 210 (e.g., between suspension rod 194 and stem 200). Damping fluid 212 may be configured to provide a constant damping force between suspension rod 194 and stem 200. For instance, damping fluid 212 may provide a viscous damping force between suspension rod 194 and stem 200. According to at least some embodiments, damping fluid 212 may be provided over the entire length of stem 200, such that a full coating barrier is provided between suspension rod 194 and stem 200 (e.g., along the radial direction R) via damping fluid 212. Advantageously, the constant viscous damping force may resist wear by ensuring no part-to-part contact between suspension rod 194 and stem 200. Additionally or alternatively, a high viscosity of damping fluid 212 may advantageously ensure that damping fluid 212 remains in place (e.g., between suspension rod 194 and stem 200 during operation.

Damping fluid 212 may be an oil-based lubricant. For instance, damping fluid 212 may include a hydro-carbon base or a silicone base. According to some applications, the hydro-carbon base may provide a relatively high viscosity between suspension rod 194 and stem 200. The hydro-carbon base may be a high viscosity grease, such as a high-molecular-weight synthetic oil for example. Advantageously, movement of damping body 192 may be damped viscously, thereby attenuating vibrations of tub 64. Additionally or alternatively, a life of constant damping system 190 may be increased due to restricted wear between suspension rod 194 and stem 200.

Damping fluid 212 may include one or more additives. For instance, damping fluid 212 may include a thickener (or thickening agent or thickening additive), such as a soap, clay, silica, or synthetic material, for example. The thickener may increase a viscosity of damping fluid 212 so that, according to certain embodiments, a greater damping level may be achieved. Damping fluid 212 may further include one or more of a polymer additive, a tackifier (e.g., to increase temporary adhesion between suspension rod 194 and stem 200), a polytetrafluoroethylene (PTFE), a silica agent, a thermoplastic polymer, or the like. For instance, one or more of the additives may provide a lubricity to damping fluid 212, to prevent shear-thinning of damping fluid, or the like. It should be understood that multiple combinations of the above-mentioned additives may be utilized according to specific embodiments.

Figure 5:
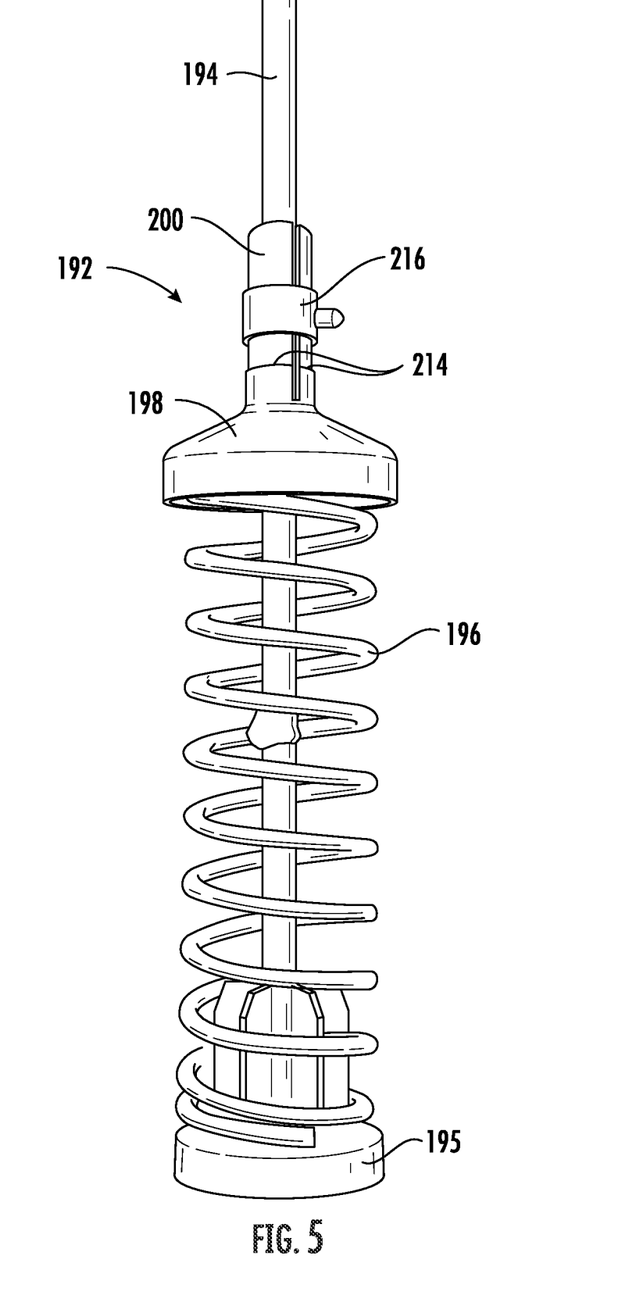
FIG. 5 provides a perspective view of a portion of a damping assembly according to another exemplary embodiment of the present disclosure.

Referring now generally to FIGS. 5 through 8, an alternate embodiment of constant damping system 190 will be described in detail. Like reference numerals will refer to like features where appropriate, and certain detailed descriptions of repeat features will be foregone for the sake of brevity. As shown in FIG. 5, constant damping system 190 may include damping body 192, suspension rod 194, and axial spring 196. Similar to the embodiment shown in FIG. 3, suspension rod 194 may be attached to stopper 195 (e.g., at a distal end thereof). Axial spring 196 may surround suspension rod 194 (e.g., along the circumferential direction C). Axial spring 196 may further be attached to each of stopper 195 and damping body 192. For instance, axial spring 196 may be received within cavity 197 under cap 198 of damping body 192.

According to this embodiment, stem 200 may be a collet. For instance, stem 200 may include a plurality of axial segments 214 spaced apart along the circumferential direction C. Each of the plurality of axial segments 214 may extend along the axial direction A and may collectively surround suspension rod 194 (e.g., along the circumferential direction C). Additionally or alternatively, damping body 192 may include or be formed from a plastic. For instance, damping body 192 may include or be formed from a self-lubricating polymer plastic. According to at least some embodiments, damping body 192 is formed from Acetal, PEEK, Torlon, or the like. Moreover, damping body 192 may be formed from a plastic including a self-lubricating insert. Further still, damping body 192 may be formed from a first type of self-lubricating polymer and may include a second type of self-lubricating polymer as an insert. Damping body 192 may thus resist heat buildup due to friction between suspension rod 194 and stem 200 (e.g., axial segments 214).

Figure 6:
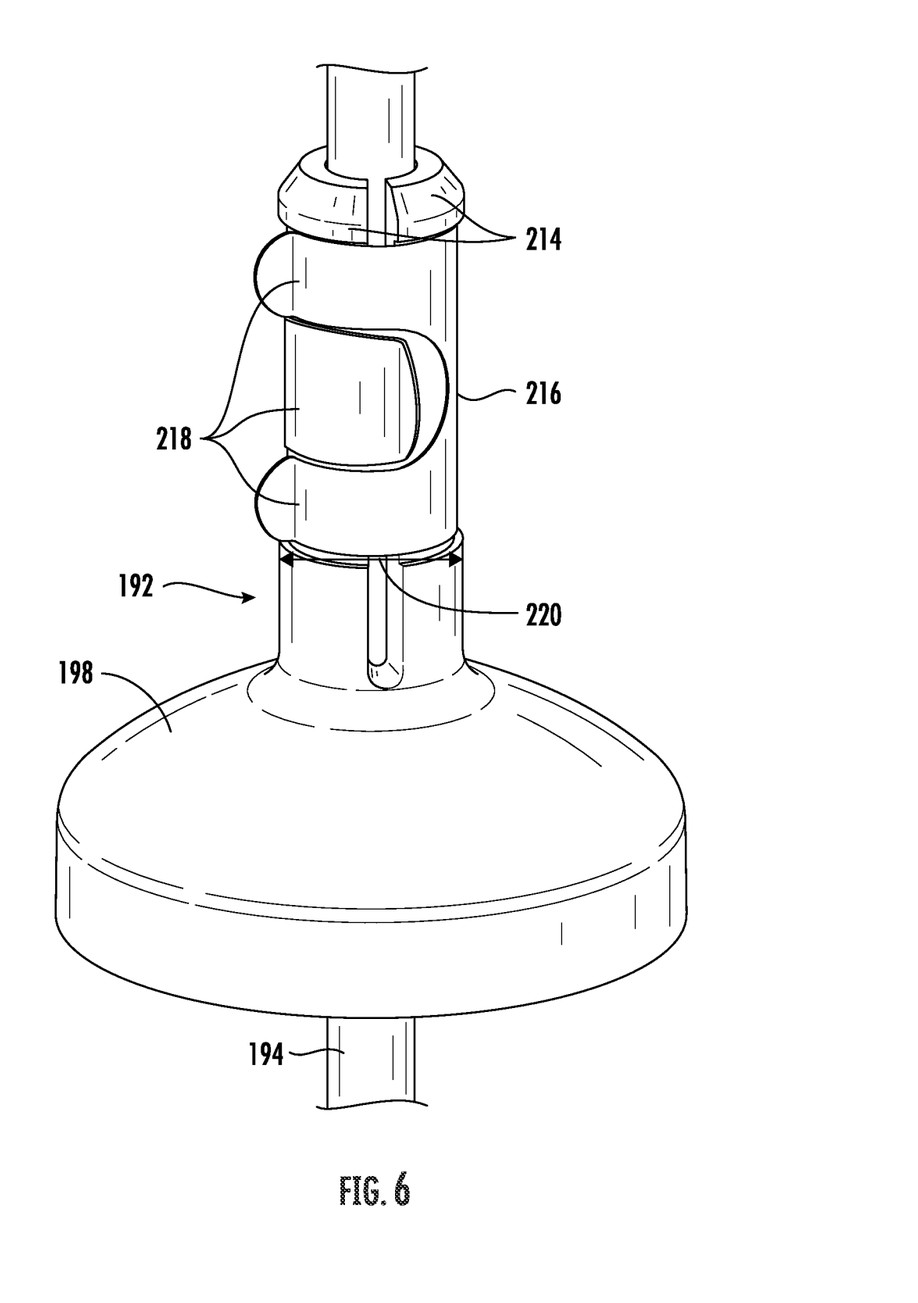
FIG. 6 provides a perspective view of a damping body, clamp spring, and suspension rod of the exemplary damping assembly of FIG. 5.
Figure 7A:
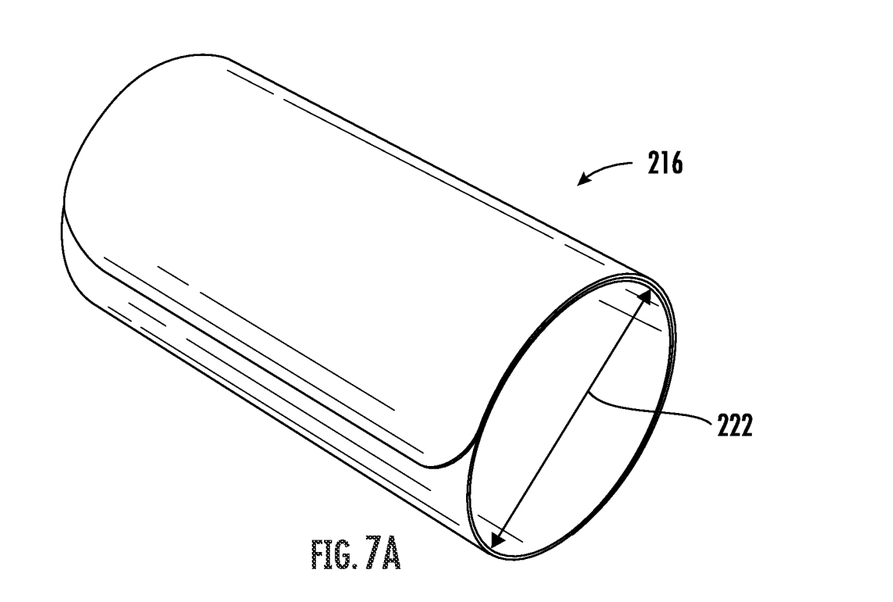
FIG. 7 provides perspective views of exemplary clamp springs of the damping assembly of FIG. 5.
Figure 7B:
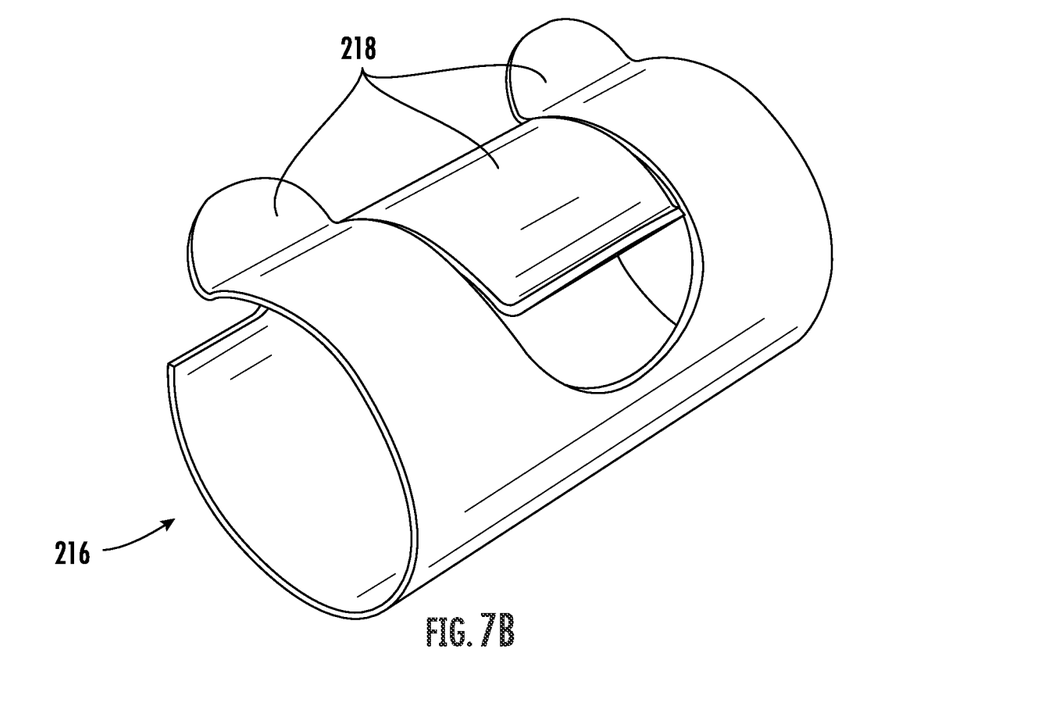

Constant damping system 190 according to this embodiment may include a spring clamp 216. In detail, spring clamp 216 may surround stem 200 (e.g., axial segments 214) along the circumferential direction C. Accordingly, spring clamp 216 may provide a constant radial force (e.g., a squeezing force or clamping force) on stem 200, against suspension rod 194. Thus, spring clamp 216 may be formed from a resilient material capable of deflection. For example, as shown in FIG. 6, spring clamp 216 may fully surround stem 200. According to at least some embodiments, spring clamp 216 includes one or more arms 218 (FIG. 7). Collectively, arms 218 may wrap each of the plurality of axial segments 214.

Stem 200 may define an outer diameter 220. Outer diameter 220 may be the same as or different from outer diameter 208 (described above). For instance, the plurality of axial segments 214 may collectively define outer diameter 208. For at least one example, outer diameter 220 may be between about 0.35 inches and about 0.40 inches. Specifically, according to this example, outer diameter 220 may be about 0.38 inches before experiencing any wear (e.g., damping wear) from friction with suspension rod 194. Moreover, after a predetermined amount of wear (e.g., frictional damping wear), outer diameter 220 may be reduced to about 0.28 inches. Thus, in order to maintain a constant and acceptable level of damping between damping body 192 and suspension rod 194, a radial force may be applied to stem 200.

In detail, spring clamp 216 may be formed so as to apply the radial force throughout a life of damping body 192. Continuing with the example given above, spring clamp 216 may be formed with an inner diameter 222 that is smaller than outer diameter 220 of stem 200. For instance, inner diameter 222 of spring clamp 216 may be smaller than outer diameter 220 of stem 200 after the predetermined amount of wear. Further to the example above, if outer diameter 220 is reduced to about 0.28 inches after the predetermined amount of wear, inner diameter 222 of spring clamp 216 may be less than 0.28 inches. According to at least one example, inner diameter 222 of spring clamp 216 is 0.25 inches (e.g., at rest). Accordingly, the radial force may be applied to stem 200 throughout a usable life of damping body 192. It should be noted that the dimensions provided herein are by way of example only, and that any suitable measurements may be incorporated into specific embodiments. Referring to FIG. 7, spring clamp 216 may be formed as a continuous roll of malleable material. As mentioned above, spring clamp may be formed to have an inner diameter 222 smaller than an outer diameter 220 of stem 200.

In some applications, damping fluid 212 may be applied between suspension rod 194 and the plurality of axial segments 214. For example, damping fluid 212 may have a silicone base. Further, damping fluid 212 may include one or more additives (e.g., one or more of the above-mentioned additives) to improve a performance thereof. In particular, damping fluid 212 may include a PTFE and/or a silica additive to improve heat resistance and add lubricity between axial segments 214 and suspension rod 194. Thus, according to this embodiment, constant damping system 190 may utilize a combination of viscous damping (e.g., between damping fluid 212 and suspension rod 194) and friction damping (e.g., between axial segments 214 and suspension rod 194). Advantageously, utilizing spring clamp 216 and damping fluid 212, a constant damping force may be applied to constant damping system 190 throughout a usable life thereof.

Figure 8:
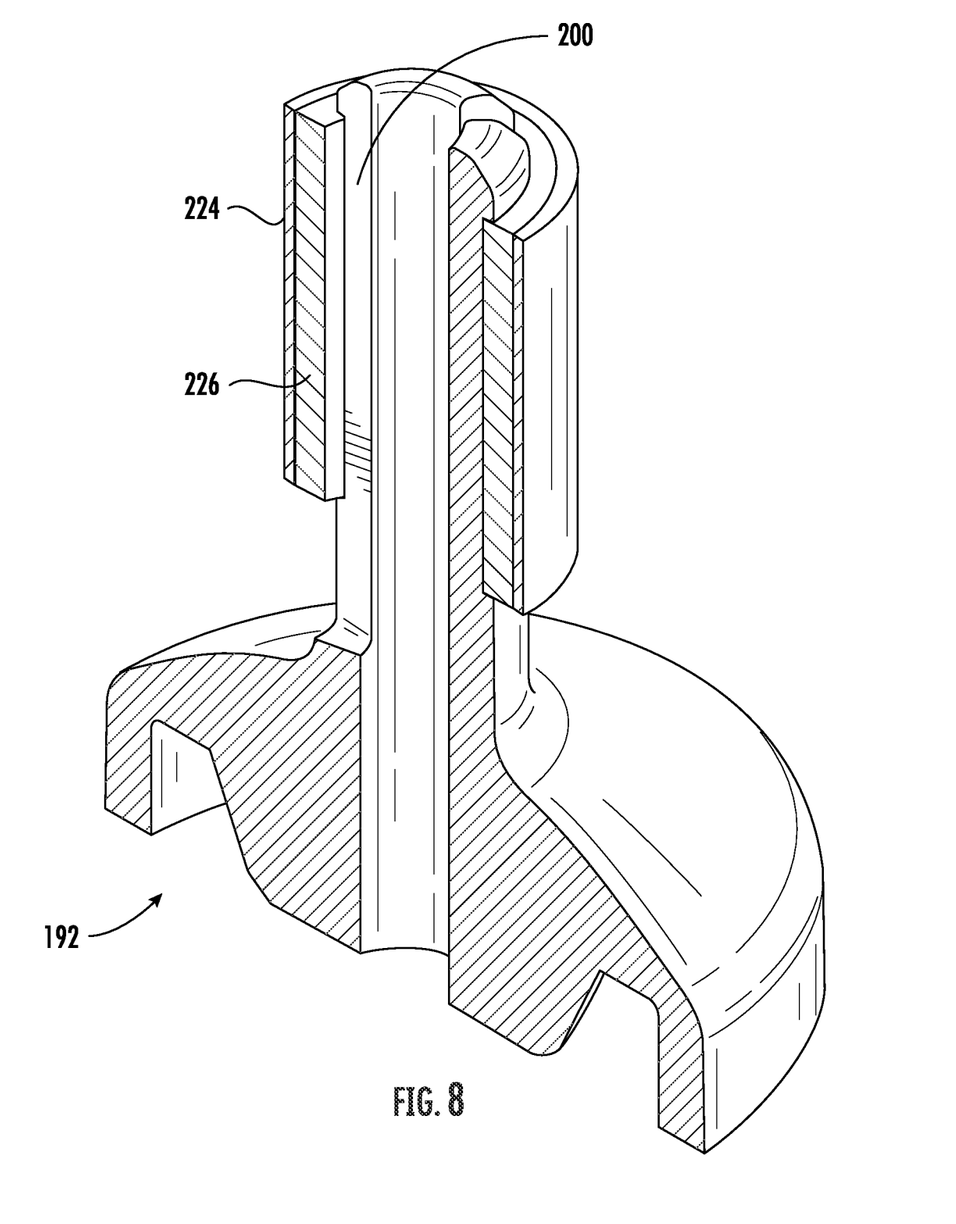
FIG. 8 provides a perspective cross-section view of a damping body and clamp spring according to another embodiment of the present disclosure.

Referring briefly to FIG. 8, constant damping system 190 may include one or more means for adjustable damping. For instance, damping body 192 may include a jacket 224 surrounding stem 200 (e.g., axial segments 214 of the collet). An airbag 226 may be provided within jacket 224 and contacting the plurality of axial segments 214. The airbag may be selectively inflated or deflated to predetermined levels to adjust a level of damping provided to stem 200 (e.g., axial segments 214). For instance, when a relatively large washing (or drying) load is placed in tub 64 (or basket 70), airbag 226 may be inflated to provide a higher radial force to stem 200. Similarly, when a relatively small load is washed or dried, airbag 226 may be deflated to limit damping, thus reducing unnecessary wear and tear on damping body 192 and suspension rod 194 and providing a more beneficial amount of damping to washing machine appliance over the course of the washing or drying operation.

The adjustable damping means may further include a hose clamp provided around stem 200 (e.g., axial segments 214). A motor (e.g., a stepper motor) may be attached to the hose clamp. The motor may be selectively activated to tighten or loosen the hose clamp around stem 200. Thus, similar to the airbag, a radial force and subsequent damping level may be adjusted without need to disassemble washing machine appliance 100.

According to the embodiments described herein, a constant damping system may provide reliable damping over a lifetime of the parts included. For instance, the constant damping system may be used in a washing machine appliance (or other laundry treatment appliance). The constant damping system may include a damping body, a suspension rod, an axial spring, and a damping fluid. The damping body may include a cap and a stem extending from the cap. The stem may surround the suspension rod and provide damping to, for example, a wash tub. The damping fluid may be provided between the stem and the suspension rod. The damping fluid may be hydro-carbon based or silicone based. The hydro-carbon based damping fluid may resist wear and heat and provide constant damping without damaging parts of the damping system. The silicone based damping fluid may provide lubrication and resist heat buildup between parts in aiding in frictional damping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A constant damping system defining an axial direction, a radial direction, and a circumferential direction, the constant damping system comprising:
   a damping body comprising a cap and a stem extending from the cap along the axial direction;
   a suspension rod accepted through the damping body along the axial direction;
   a damping fluid provided between the suspension rod and the stem of the damping body, the damping fluid configured to provide a constant damping force between the suspension rod and the stem, wherein the damping fluid is one of a hydro-carbon base or a silicon base; and
   an axial spring having a first end attached to the suspension rod and a second end contacting the cap of the damping body.

2. The constant damping system of claim 1, wherein a radial tolerance between the suspension rod and the stem of the damping body is between 0.01 inches and 0.0001 inches.

3. The constant damping system of claim 2, wherein the radial tolerance between the suspension rod and the stem of the damping body is 0.001 inches.

4. The constant damping system of claim 2, wherein the damping fluid is a hydro-carbon high viscosity grease.

5. The constant damping system of claim 4, wherein the damping fluid comprises at least one additive, the at least one additive comprising at least one of a thickener, a polymer, a silica, or a thermoplastic polymer.

6. The constant damping system of claim 2, wherein the suspension rod is formed from a zinc coated steel and the damping body is formed from a plastic.

7. The constant damping system of claim 1, wherein the stem is a collet comprising a plurality of axial segments spaced apart along the circumferential direction.

8. The constant damping system of claim 7, further comprising:
   a spring clamp circumferentially surrounding the collet, the spring clamp configured to provide a constant clamping force to the collet along the radial direction.

9. The constant damping system of claim 8, wherein an inner diameter of the spring clamp at a resting position is less than an outer diameter of the collet.

10. The constant damping system of claim 7, wherein the damping fluid is a silicon based grease.

11. A laundry treatment appliance, comprising:
    a cabinet;
    a tub provided within the cabinet; and
    a constant damping system that connects the tub to the cabinet, the constant damping system defining an axial direction, a radial direction, and a circumferential direction, wherein the constant damping system comprises:

a damping body comprising a cap and a stem extending from the cap along the axial direction;

a suspension rod accepted through the damping body along the axial direction;

a damping fluid provided between the suspension rod and the stem of the damping body, the damping fluid configured to provide a constant damping force between the suspension rod and the stem, wherein the damping fluid is one of a hydro-carbon base or a silicon base; and a spring having a first end attached to the suspension rod and a second end contacting the cap of the damping body.

12. The laundry treatment appliance of claim 11, wherein a radial tolerance between the suspension rod and the stem of the damping body is between 0.01 inches and 0.0001 inches.

13. The laundry treatment appliance of claim 12, wherein the radial tolerance between the suspension rod and the stem of the damping body is 0.001 inches.

14. The laundry treatment appliance of claim 12, wherein the damping fluid is a hydro-carbon high viscosity grease.

15. The laundry treatment appliance of claim 14, wherein the damping fluid comprises at least one additive, the at least one additive comprising at least one of a thickener, a polymer, a silica, or a thermoplastic polymer.

16. The laundry treatment appliance of claim 11, wherein the stem is a collet comprising a plurality of axial segments spaced apart along the circumferential direction.

17. The laundry treatment appliance of claim 16, wherein the constant damping system further comprises:

a spring clamp circumferentially surrounding the collet, the spring clamp configured to provide a constant clamping force to the collet along the radial direction.

18. The laundry treatment appliance of claim 17, wherein an inner diameter of the spring clamp at a resting position is less than an outer diameter of the collet.

19. The laundry treatment appliance of claim 16, wherein the damping fluid is a silicon based grease.

20. A constant damping system defining an axial direction, a radial direction, and a circumferential direction, the constant damping system comprising:

a damping body, the damping body comprising:
a cap; and
a collet extending from the cap along the axial direction, the collet comprising a plurality of segments extending along the axial direction and spaced apart along the circumferential direction;

a suspension rod accepted through the damping body along the axial direction;

a damping fluid provided between the suspension rod and the stem of the damping body, the damping fluid configured to provide a constant damping force between the suspension rod and the stem, wherein the damping fluid is one of a hydro-carbon base or a silicon base;

a spring clamp provided circumferentially around the collet, the spring clamp providing a constant radial force to the collet and the suspension rod; and an axial spring having a first end attached to the suspension rod and a second end contacting the cap of the damping body.

* * * * *